United States Patent  [19]

Lyall

[11]   3,850,797
[45] Nov. 26, 1974

[54] METHOD OF STERILIZING REVERSE OSMOSIS WATER TREATMENT UNITS

[75] Inventor: Charles E. Lyall, Deerfield, Ill.

[73] Assignee: Culligan International Company, Northbrook, Ill.

[22] Filed: June 12, 1973

[21] Appl. No.: 369,173

[52] U.S. Cl.......................... 210/23, 21/58, 210/79
[51] Int. Cl...... B01d 13/00, A61l 9/00, A61l 13/02
[58] Field of Search............ 21/58; 210/22, 23, 500, 210/79

[56] References Cited
UNITED STATES PATENTS
3,700,591   10/1972   Higley.................................. 210/23

OTHER PUBLICATIONS

Office of Saline Water, R & D Report No. 430, pp. 15, 16.
Office of Saline Water, R & D Report No. 430, pp. 21, IV-1, page 42.

Primary Examiner—Joseph Scovronek
Assistant Examiner—Michael S. Marcos
Attorney, Agent, or Firm—Hill, Gross, Simpson, Van Santen, Steadman, Chiara & Simpson

[57]   ABSTRACT

The semi-permeable membrane of a reverse osmosis water treatment unit is treated during periods of "down time" with a solution having a pH preferably in the range of 4.5 and 6.0 and tending both to sterilize the membrane as well as to retard bacterial and fungal growth thereon. The method comprises: passing an aqueous solution of the desired pH and containing formaldehyde and an acid selected from the group consisting of acetic, formic, citric, fumaric and boric, into the water treatment unit and through the membrane thereof and maintaining said aqueous solution in the unit and in contact with the membrane during extended periods of unit "down time" to both sterilize the unit and extend the life of its membrane.

7 Claims, 1 Drawing Figure

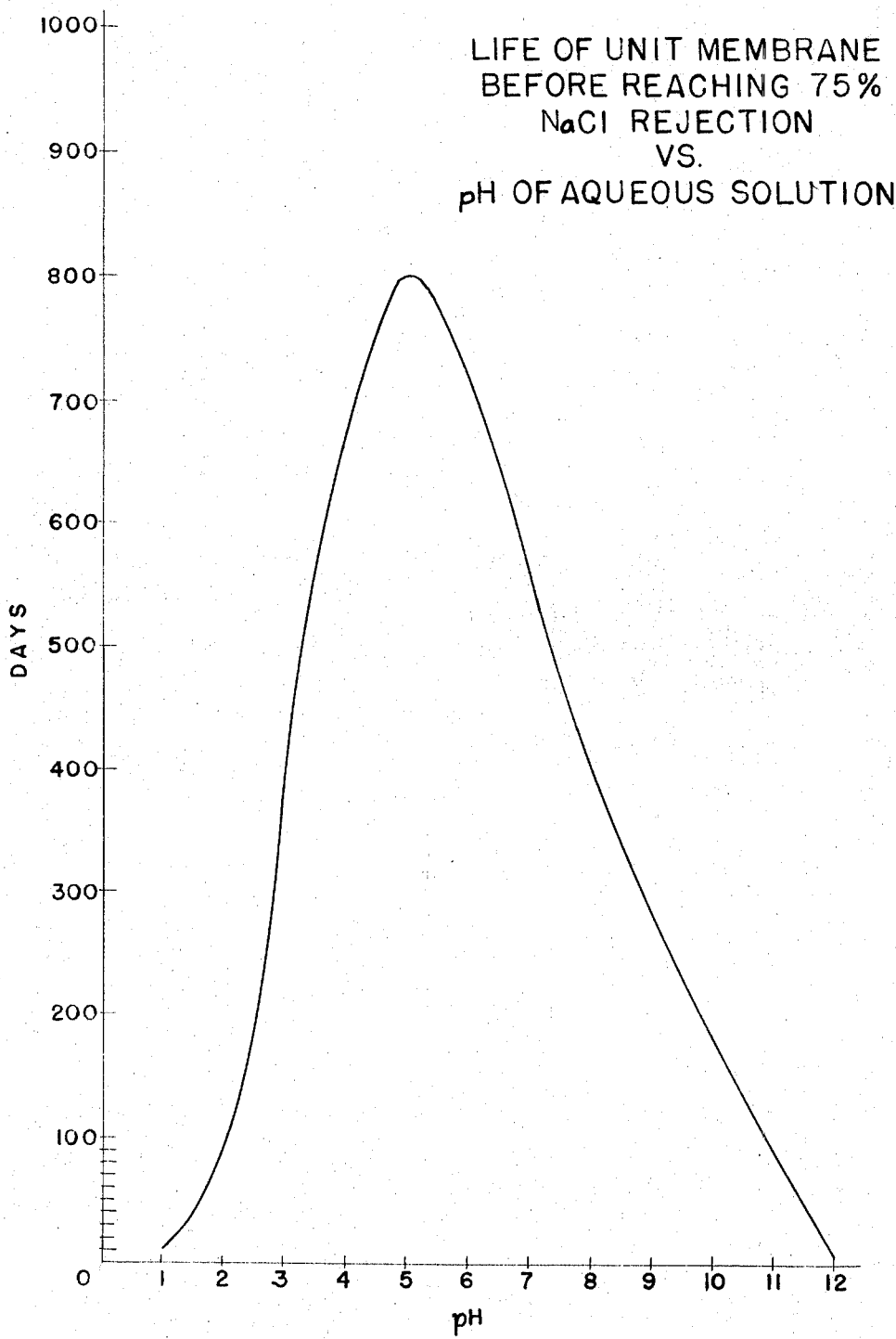

METHOD OF STERILIZING REVERSE OSMOSIS WATER TREATMENT UNITS

BACKGROUND OF THE INVENTION

This invention relates to a water treatment unit which operates on the reverse osmosis principle and more particularly, to a method for sterilizing reverse osmosis water treatment units, and for extending the life of the semi-permeable membranes employed in such units.

Water purification by the reverse osmotic process can effectively be employed to provide highly purified water for domestic, industrial and medical purposes. Reverse osmosis will be understood to refer to the process of diffusion of a solution through a semi-permeable membrane from a concentrated solution to a relatively more dilute fluid, e.g., dilute water occasioned by placing the concentrated solution under a pressure greater than the osmotic pressure of the concentrate. Water purification systems utilizing the reverse osmosis process are disclosed in the Westmoreland, Bray and Rak U.S. Pat. Nos. 3,367,504; 3,367,505; and 3,456,803; respectively.

A recognized shortcoming of the reverse osmosis water treatment process, however, is that membranes, such as those prepared from cellulose acetate, chemically react with water and gradually lose the ability to desalt water. The rate of reaction is dependent upon the pH of the water as well as some uet unidentified substances originating from bacterial and fungal growth on or near the membranes. These processes take place when the membrane is idle as well as when it is operating. However, the substances associated with the bacterial and fungal growth are swept away when the membrane is in operation.

Water treatment units operating on the reverse osmosis principle may for instance be employed for medical purposes to supply highly purified water under near aseptic conditions to a hemodialysis unit and under such circumstances the water treatment unit may be subjected to relatively long periods of "down time" between periods of use. In order to reduce the frequency and obvious expense of membrane replacement, it is important to increase the membrane life to the greatest extent reasonably possible.

SUMMARY OF THE INVENTION

I have, accordingly, developed a method for treating a reverse osmosis water treatment unit and particularly the semi-permeable membrane used therein in such a manner both to sterilize and to extend the life of the membrane of the unit. This method comprises: passing an aqueous solution having a pH in the range of from 4.5 to 6 and containing formaldehyde or the like and an acid selected from the group consisting of acetic, formic, citric, fumaric and boric into the water treatment unit and through the membrane of the unit during a period of unit "down time" and maintaining the solution in the unit and in contact with the membrane for as long a period of time as is reasonably possible and preferably until such time as the unit must again be activated.

Thus, an object of the present invention is to provide a practical, effective means for sterilizing water treatment units operating on the reverse osmosis principle, and for extending the life of the membrane of the unit.

It is therefore an object of the invention to immerse the membrane of a reverse osmosis water treatment unit in a bacterial and fungal growth inhibitor during the periods of unit disuse.

It is a further object of the invention to maintain the pH of the solution contacting the membrane within a predetermined critical range as required by the characteristic of the membrane itself during those periods when the membrane is not being used in a water treatment process.

Other objects, features and advantages of the present invention will be readily apparent from the following description of the preferred embodiment thereof, taken in conjunction with the accompanying drawing which is a graph illustrating the effect of the pH of the aqueous solution on the life of a water treatment unit membrane.

DESCRIPTION OF THE PREFERRED EMBODIMENTS

A reverse osmosis water treatment unit generally comprises a pre-filter assembly, a pump, a membrane module assembly having a semi-permeable membrane fitted therein and one or more sub-micron filters on the downstream side of the membrane module assembly. In accordance with the principles of the present invention an aqueous treatment solution which will hereafter be described in greater detail is fed into the water treatment system preferably upstream of the first pre-filter in order to substantially displace all of the water formerly in the system so that, in particular, the semi-permeable membrane is completely immersed within the aqueous solution. The aqueous solution preferably remains in the system for as long as the system is in a period of disuse (that is during its "down time") and the solution is then purged from the system by running source water through the system until the system can again be used for its intended function.

The most effective results will be obtained if the water treatment unit remains filled with the aqueous solution whenever it is in a period of disuse although effective sterilizing results can be provided even when the solution is maintained in the unit for periods of between 2 and 5 hours.

In its preferred form, the aqueous solution generally has formaldehyde added to it to sterilize the unit including the semi-permeable membrane and thereby inhibit bacterial and fungal growth. A weak acid is added to lower the pH of the water solution to a level at which the solution, when in contact with the membrane, can effectively extend the membrane life.

The amount of formaldehyde in the water solution comprises by weight between 0.5 and 2.0 percent and preferably about 1.0 percent by weight.

The acid contained within the aqueous solution can be any suitable weak acid which will tend to form a solution having a stable pH of 4.5 to 6.0 and may comprise acetic, formic, citric, fumaric or boric acid and the like. Acetic acid, being the most available, is preferably used in the process.

The amount of acid added to the water solution will vary in accordance with the particular type of acid used and the alkalinity of the water solution itself. The water solution may have an initial pH ranging between about 6 and 10. Since it is desired to reduce the pH of the aqueous solution to between 4.5 and 6.0 and preferably to between 5.0 and 5.5, the alkalinity of the source water will determine the acid content of the aqueous solution. Accordingly, with a water solution having an initial alkalinity of about 5 grains per gallon and a pH of about 8, the amount of acetic acid added to the solution to lower its pH to the desired range will generally be between about 6 and 14 grains per gallon.

The formaldehyde, while being preferred as a bacterial and fungal growth inhibitor, may be substituted by any compatible material which can perform the same functions in the unit.

In order to determine the effect of the aqueous solution at a reduced pH level on the life of the semi-permeable membrane of a reverse osmosis water treatment unit, a series of aqueous solutions containing formaldehyde and acetic acid, each having a different pH, ranging from 1 to 12, were used to treat identical semi-permeable membranes in a corresponding series of water treatment units. Periodically, after treating each of the membranes respectively with the various aqueous solutions, a solution of 2,000 ppm of NaCl was passed through the unit and the membrane at a pressure of about 200 psi. The effect of each of the aqueous solutions of different pH's on the life of the membrane of the unit is recorded in the table below, and illustrated in the graph in the drawing. The results provided in the table below and illustrated in the graph have as a basis, the length of time it takes the membrane, i.e., a cellulose acetate membrane, to degrade to a level where it rejects not more than 75 percent of the NaCl in the solution (that is, it allows the passage therethrough of 25 percent or more of the NaCl in the solution). Normally, a new membrane has a NaCl rejection in excess of 90 percent, or a NaCl passage less than 10 percent. When the membrane degrades to a point where it has only at 75 percent NaCl rejection it is generally considered unsatisfactory and in need of replacement.

| Membrane | pH of Aqueous Solution | Life of Membrane (days) |
| --- | --- | --- |
| A | 1 | 6 |
| B | 2 | 100 |
| C | 3 | 380 |
| D | 4 | 660 |
| E | 5 | 800 |
| F | 6 | 720 |
| G | 7 | 560 |
| H | 8 | 400 |
| I | 9 | 240 |
| J | 10 | 220 |
| K | 11 | 96 |
| L | 12 | 2 |

As can be seen in the results provided in the table and in the graph, the optimum pH of the aqueous solution passed into the unit to sterilize the unit and extend the life of the membrane is between about 5.0 and 5.5. For the greatest increase of the life of the membrane, the results show that the pH of the aqueous solution should be between about 4.5 and about 6.0. Also, as shown in the graph of the drawing and in the table above, the life of the membrane is approximately doubled at the optimum pH level, i.e., from 5.0 to 5.5, as compared to the life of the membrane with the solutions having a pH of 3 to 8. That is, at a pH of 3 the approximate life of the membrane is 380 days whereas at a pH of 5 the life of the membrane is 800 days.

It will be understood that this embodiment of my invention has been used for illustrative purposes only, and that other modifications and variations of the process disclosed may be made without departing from the spirit and scope of the concepts of the invention as defined in the appended claims.

I claim as my invention:

1. A method of treating a semi-permeable membrane in a reverse osmosis unit having an activated period and a down-time period to sterilize said membrane and extend its useful life, which comprises:

immersing said membrane in an aqueous solution having a pH in the range of 4.5 to 6, said solution comprising a mixture of water, acetic acid and a bacterial fungal growth inhibitor compatible with said acid; and maintaining said solution in contact with said membrane for at least a portion of said down-time period of the reverse osmosis unit.

2. A method according to claim 1, wherein said bacterial and fungal growth inhibitor is formaldehyde.

3. A method according to claim 2, wherein said aqueous solution contains acid in an amount between about 6 and 14 grains per gallon of solution and between about 0.5 and about 2.0 percent by weight of formaldehyde.

4. A method according to claim 1, wherein the pH of said aqueous solution is between about 5.0 and about 5.5.

5. A method according to claim 1, wherein said aqueous solution is maintained in said unit and in contact with said membrane for a period of between about 2 and about 5 hours.

6. A method of treating a semi-permeable membrane in a reverse osmosis unit having an activated period and a down-time period to sterilize said membrane and extend its useful life, which comprises:

immersing said membrane in an aqueous solution having a pH in the range of 4.5 to 6, said solution comprising a mixture of water, acetic acid in the amount of about 10 grains per gallon of solution and a bacterial and fungal growth inhibitor compatible with said acid; and maintaining said solution in contact with said membrane for at least a portion of said down-time period of the reverse osmosis unit.

7. A method of treating a semi-permeable membrane in a reverse osmosis unit having an activated period and a donw-time period to sterilize said membrane and extend its useful life, which comprises:

immersing said membrane in an aqueous solution having a pH in the range of 4.5 to 6, said solution comprising a mixture of water, acetic acid in the amount of about 10 grains per gallon of solution and about 1 percent by weight of formaldehyde; and maintaining said solution in contact with said membrane for at least a portion of said down-time period of the reverse osmosis unit.

* * * * *